US011940122B2

(12) United States Patent
Graff et al.

(10) Patent No.: US 11,940,122 B2
(45) Date of Patent: Mar. 26, 2024

(54) LED LUMINAIRE HAVING CENTRAL DRIVER HOUSING

(71) Applicant: Appleton Grp LLC, Rosemont, IL (US)

(72) Inventors: Timothy E. Graff, Arlington Heights, IL (US); Santosh K. Patil, Pune (IN); Sumit Kumar, Moradabad (IN); Karan Mandlekar, Pune (IN); SB Chethan, Channagiri (IN); Nagesh C. Nath, Pune (IN); Sourabh D. Patil, Tal (IN); Shriprasad V. Khadse, Malkapur (IN)

(73) Assignee: Appleton Grp LLC, Rosemont, IL (US)

( * ) Notice: Subject to any disclaimer, the term of this patent is extended or adjusted under 35 U.S.C. 154(b) by 74 days.

(21) Appl. No.: 17/709,835

(22) Filed: Mar. 31, 2022

(65) Prior Publication Data

US 2022/0349539 A1 Nov. 3, 2022

(30) Foreign Application Priority Data

May 3, 2021 (IN) ............................. 202121020210

(51) Int. Cl.
*F21V 23/00* (2015.01)
*F21S 8/04* (2006.01)
(Continued)

(52) U.S. Cl.
CPC .............. *F21S 8/046* (2013.01); *F21V 17/12* (2013.01); *F21V 23/005* (2013.01); *F21Y 2103/33* (2016.08); *F21Y 2115/10* (2016.08)

(58) Field of Classification Search
CPC .... F21V 23/003; F21V 23/005; F21V 23/007; F21V 23/008; F21V 29/503; F21V 29/74;
(Continued)

(56) References Cited

U.S. PATENT DOCUMENTS 8,764,243 B2 7/2014 Zimmer et al.
8,783,937 B2 * 7/2014 Steedly ................ F21V 29/506 362/249.02
(Continued)

FOREIGN PATENT DOCUMENTS

CN 201003698 Y 1/2008
CN 206572454 U 10/2017

OTHER PUBLICATIONS

First Examination Report (FER) for India Patent Application No. 202121020210 dated Nov. 16, 2020, pp. 1-5.
(Continued)

*Primary Examiner* — Ismael Negron
(74) *Attorney, Agent, or Firm* — McDonnell Boehnen Hulbert & Berghoff LLP

(57) ABSTRACT

A luminaire including an outer support member having a plurality of LED arrays; a driver housing centrally located within an interior of the outer support member; a plurality of attachment arms extending from the outer support member and secured to the driver housing, resulting in open spaces between the attachment arms and between outer support member and the driver housing and a plurality of heat dissipating fins extending from an upper surface of the outer support member to the driver housing.

16 Claims, 16 Drawing Sheets

FIG. 12B

(51) Int. Cl.
*F21V 17/12* (2006.01)
*F21Y 103/33* (2016.01)
*F21Y 115/10* (2016.01)

(58) Field of Classification Search
CPC ........ F21V 29/77; F21V 29/773; F21V 17/12; F21S 8/046
See application file for complete search history.

(56) References Cited

U.S. PATENT DOCUMENTS

| | | | | |
|---|---|---|---|---|
| 8,899,786 | B1 | 12/2014 | Moghal et al. | |
| 9,091,417 | B2 * | 7/2015 | Castillo | F21V 23/0471 |
| 9,441,634 | B2 * | 9/2016 | Spiro | F21V 29/508 |
| 9,581,324 | B2 * | 2/2017 | Zhai | F21V 21/08 |
| 9,702,539 | B2 * | 7/2017 | Scarlata | F21V 29/773 |
| 10,082,284 | B2 * | 9/2018 | Shum | H05B 45/3725 |
| 10,197,262 | B2 * | 2/2019 | Sohn | F21V 29/763 |
| 10,234,127 | B2 * | 3/2019 | Bendtsen | F21S 8/026 |
| 10,379,278 | B2 * | 8/2019 | Wilcox | F21S 8/086 |
| 10,487,989 | B2 * | 11/2019 | Cao | F21K 9/235 |
| 2010/0271708 | A1 | 10/2010 | Wilcox | |
| 2011/0103051 | A1 | 5/2011 | Wilcox et al. | |
| 2011/0140589 | A1 * | 6/2011 | Daniel | F21K 9/232 313/110 |
| 2012/0087118 | A1 | 4/2012 | Bailey et al. | |
| 2012/0300456 | A1 | 11/2012 | Phillips, III et al. | |
| 2013/0170207 | A1 * | 7/2013 | Garcia | F21V 5/007 362/238 |
| 2017/0153016 | A1 * | 6/2017 | Lee | F21V 29/77 |
| 2020/0029403 | A1 | 1/2020 | Chaturvedi et al. | |
| 2022/0221133 | A1 | 7/2022 | Dachian | |

OTHER PUBLICATIONS

"SafeSite LED High Bay—ATEX / IECEx—APAC—for Indoor and Outdoor Industrial Applications", www.dialight.com, Dialight_LED_SafeSite_HighBay_ATEX_HEA_SpecSheet_APAC_June2020, 6 pages.
"A Brighter Future for Led Floodlighting", Areamaster Generation 2 LED Luminaires, www.MasteringLED.com, Appleton Grp LLC, 2018, 2 pages.
"LED Lighting Solutions Engineered for Demanding Environments", Appleton LED Luminaires, Appleton Grp LLC, 2021, 56 pages.
"Appleton LED Luminaires Selection Guide", www.appletonelec.com, Appleton Grp LLC, 2020, 2 pages.
"Phuzion PHS LED High Bay with Uplight", Holophane Leader in Lighting Solutions, Acuity Brands, www.holophane.com, 10 pages.
Prior Art "Champ Pro PVM High Bay", figure, 1 page.
Prior Art "PhuzionL Large LED High Bay", figure, 1 page.
Prior Art "Dialight Vigilant LED", figure, 1 page.

* cited by examiner

LED LUMINAIRE HAVING CENTRAL DRIVER HOUSING

RELATED APPLICATIONS

This application claims priority to Indian Patent Application No. 2021210020210 filed May 3, 2021 and entitled "Industrial High Ceiling LED Luminaire" the contents of which are incorporated by reference in their entirety.

FIELD

The present disclosure relates to the field of light fixtures. Particularly, the present disclosure relates to the field of ceiling mounted LED luminaires.

BACKGROUND

Light sources, such as LEDs, have relatively high operating temperatures. In order to increase the overall lighting brightness, a plurality of LEDs is often incorporated into a single lamp, which generates a high amount of heat. Conventionally, the heat generated by the LED lights is dissipated by providing an enclosure that includes a housing with a plurality of fins extending therefrom.

Ceiling mounted LED luminaires have been provided in the past. However, such ceiling mounted LED luminaires have a number of drawbacks. Some do not provide enough lumen output for desired applications, while others have a substantial height and offer less ambient temperature environment capabilities. Further, some have an undesirable substantial weight and do not provide easy access for wiring and field servicing, or do not provide for easy installation and have limited mounting options.

Therefore, there is felt a need for a ceiling mounted LED luminaire that alleviates the abovementioned drawbacks of the existing ceiling mounted LED luminaires. Further, there is a need for a housing of the LED luminaire that is modular such that the housing of the luminaire can accommodate various LED array configurations providing varying lumen outputs on the same housing.

SUMMARY

The present disclosure envisages an LED luminaire. The LED luminaire preferably includes an outer LED support member with LED arrays positioned on a lower side thereof, and a plurality of heat dissipating fins on the upper side thereof. The outer LED support member may be secured to a driver housing centrally located within the outer LED support member. Preferably the LED support member is an annular circular ring, but is not required to be.

A mounting bracket is also provided that may be secured to an upper surface of the LED driver housing. The mounting bracket may have a flat upper mounting surface adapted to be secured to a variety of mountings extending downwardly from the ceiling. Two arms downwardly extend from opposite ends of the upper mounting bracket. In some embodiments, the bottom of the arms may include a curved slot that may be secured to mounting extensions positioned on sides of the driver housing. Such a connection advantageously eliminates the need for fasteners advantageously allows for the mounting bracket to be attached to mountings downwardly extending from the ceiling without having the luminaire attached thereto. Once the bracket is mounted to the ceiling mountings, the mounting extensions on the driver housing may be positioned within the curved slots on the arms of the mounting bracket to secure the LED luminaire to the mounting bracket.

In high lumen applications, LED mounting extensions having one or more LED arrays positioned on a lower surface thereof and heat dissipating fins may be secured to an outer surface of the outer LED support member to provide for additional lumen output as well as heat dissipation. The one or more LED arrays positioned on the LED mounting extensions provide increased lumen capabilities. Alternatively, in high lumen applications, LED mounting extensions may be secured to an inner surface of the outer LED support member or to the LED driver housing to provide for additional heat dissipation. In this scenario, the LED mounting extensions having one or more LED arrays provide increased lumen capabilities.

In an alternate embodiment, a LED luminaire fixture is provided including a plurality of generally triangular or pie-piece shaped LED arrays positioned on the outer LED support member.

In one aspect, an LED luminaire is provided including an outer LED support member having a plurality of LED arrays positioned on a lower side thereof, an LED driver housing centrally located within an interior of the outer LED support member, wherein the outer LED support member is secured to the LED driver housing with a plurality of attachment arms that extend from inner surface of the outer LED support member to the LED driver housing, such that are open spaces between the plurality of attachment arms and between the inner surface of outer LED support member and the LED driver housing, and a plurality of heat dissipating fins positioned on an upper surface of the outer LED support member extending towards the LED driver housing.

In a further aspect, An LED luminaire is provided including an outer LED support member having a plurality of LED arrays positioned on a lower side thereof, a plurality of heat dissipating fins positioned on an upper side of the outer LED support member, an LED driver housing positioned within the outer LED support member extending between a first inner surface of the outer LED support member to an oppositely disposed second inner surface of the outer LED support member, wherein there are open spaces between sides of the LED driver housing and the outer LED support member.

In yet a further aspect, an LED luminaire is provided including an LED driver housing, and an annular heat sink surrounding, and secured to, the LED driver housing, a plurality of heat dissipating fins positioned on an upper surface of the annular circular heat sink, a plurality of LED arrays positioned on a lower surface of the heat sink, wherein the plurality of LED arrays are shaped as isosceles triangles with a smaller end thereof pointing to the LED driver housing.

BRIEF DESCRIPTION OF THE ACCOMPANYING DRAWINGS

An LED luminaire, of the present disclosure, will now be described with the help of the accompanying drawings, in which.

DETAILED DESCRIPTION

Figure 1B:
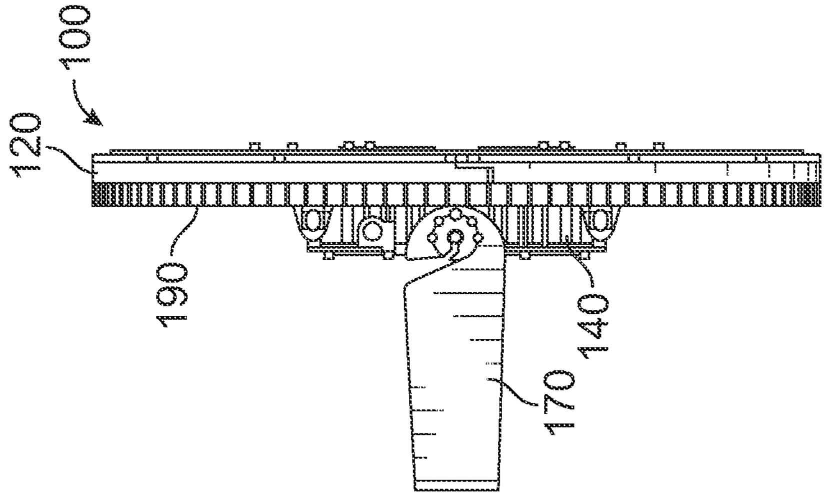
FIG. 1B illustrates a side view of the LED luminaire shown in FIG. 1A.
Figure 1A:
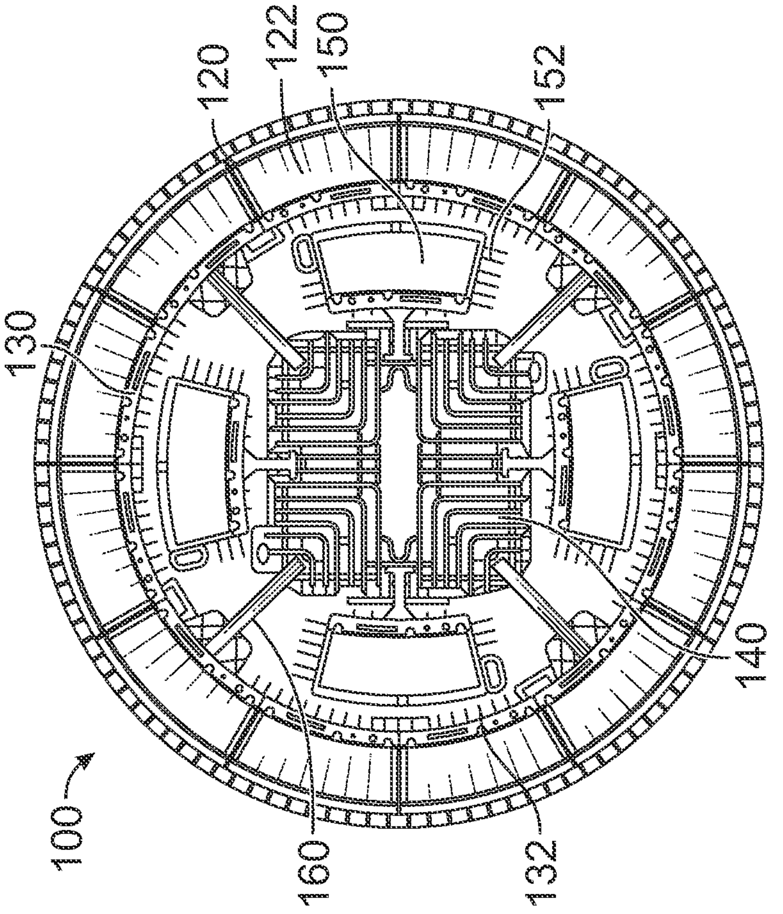
FIG. 1A illustrates a bottom view of LED luminaire 100.

FIG. 1A illustrates a bottom view of LED luminaire 100. Luminaire 100 includes an outer LED support member 120 having LEDs 122 positioned on a bottom surface thereof. LED support member 120 includes an inner mounting portion 132 that is secured with mounting arms 160 to LED driver housing 140. There are advantageously open spaces between the inner mounting portion 132 of LED support member 120 and the LED driver housing 140 to provide for thermal separation between the LEDs 122 and the LED driver housing 140 and to improve heat dissipation. In this embodiment, a plurality of LED mounting extensions 150 are shown extending outwardly from the LED driver housing 140 and positioned inwardly from outer LED support member 120. The LED mounting extensions 150 include one or more LED arrays on a lower surface thereof to provide for increased lumen output for LED luminaire 100, and in this embodiment the LED luminaire 100 has an output of 90,000 lumens.

FIG. 1B illustrates a side view of the LED luminaire 100 shown in FIG. 1A. A plurality of heat dissipating fins 190 extend inwardly on an upper surface of LED support member. A mounting bracket 170 is shown secured to the LED driver housing 140 and is used to mount the LED luminaire 100 to a ceiling.

Figure 2:
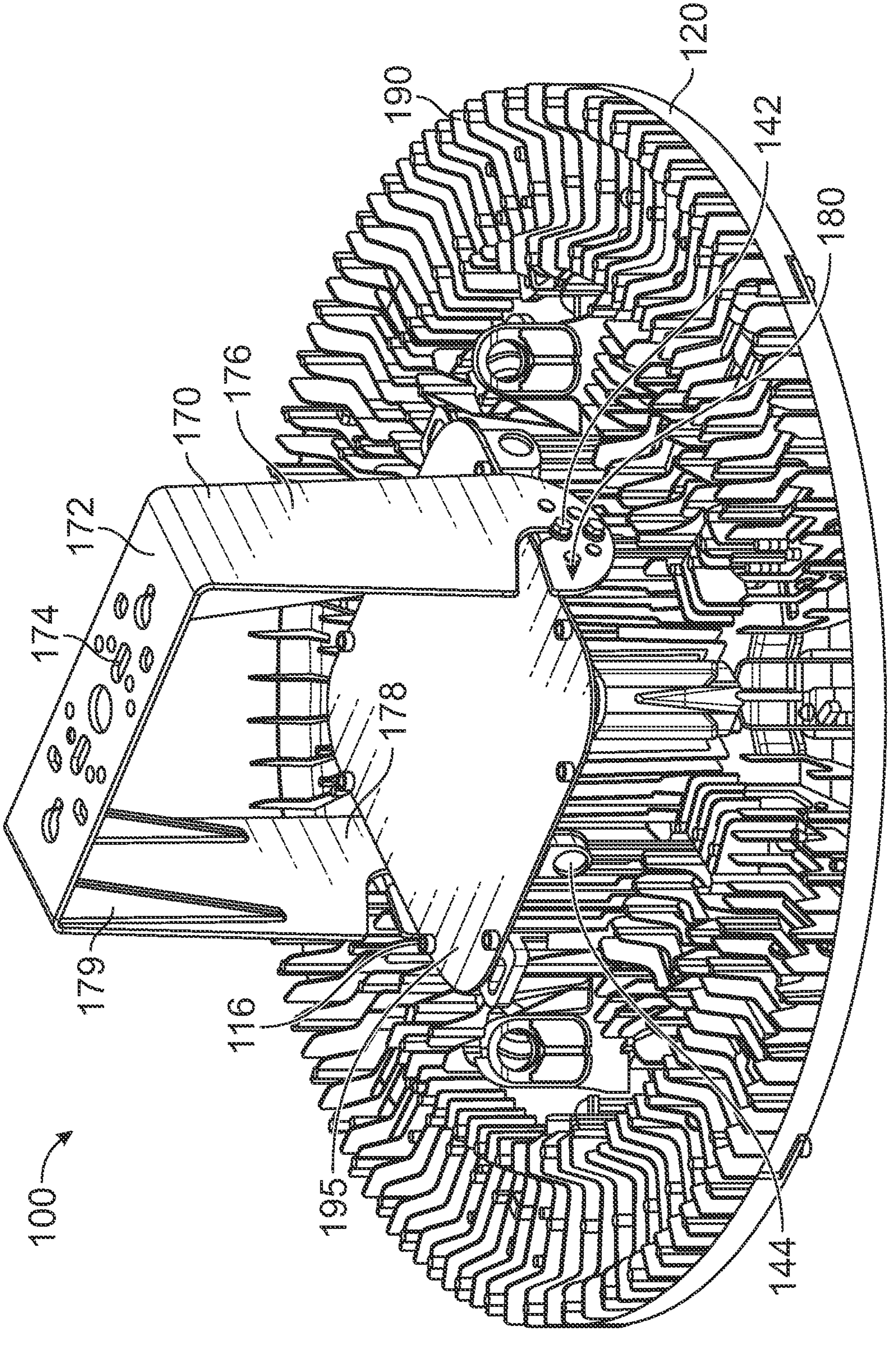
FIG. 2 illustrates a perspective top view of LED luminaire 100.

FIG. 2 illustrates a perspective top view of LED luminaire 100. Heat dissipating fins 190 extend inwardly on a top surface of outer LED support member 120 towards LED driver housing 140. LED driver housing 140 includes apertures 144 through which wiring can extend to provide for an electrical connection. A lid 195 is positioned above the LED driver housing 140 and held in place with captive screws 146. Mounting bracket 170 is shown secured to LED driver housing 140. In particular, mounting extensions 142 extend within a curved groove 180 positioned in bottom of arms 176, 178 that extend downwardly from an upper mounting bracket 172 having mounting apertures 174 used to secure the mounting bracket 172 to a ceiling. Mounting bracket 170 also includes mounting supports 179 to provide for additional strength. In operation, the mounting bracket 170 is secured to the ceiling and then the curved slots 180 on downwardly extending arms 176, 178 are directed onto mounting extensions 142 to secure the LED luminaire 100 to the LED driver housing 140.

Figure 3:
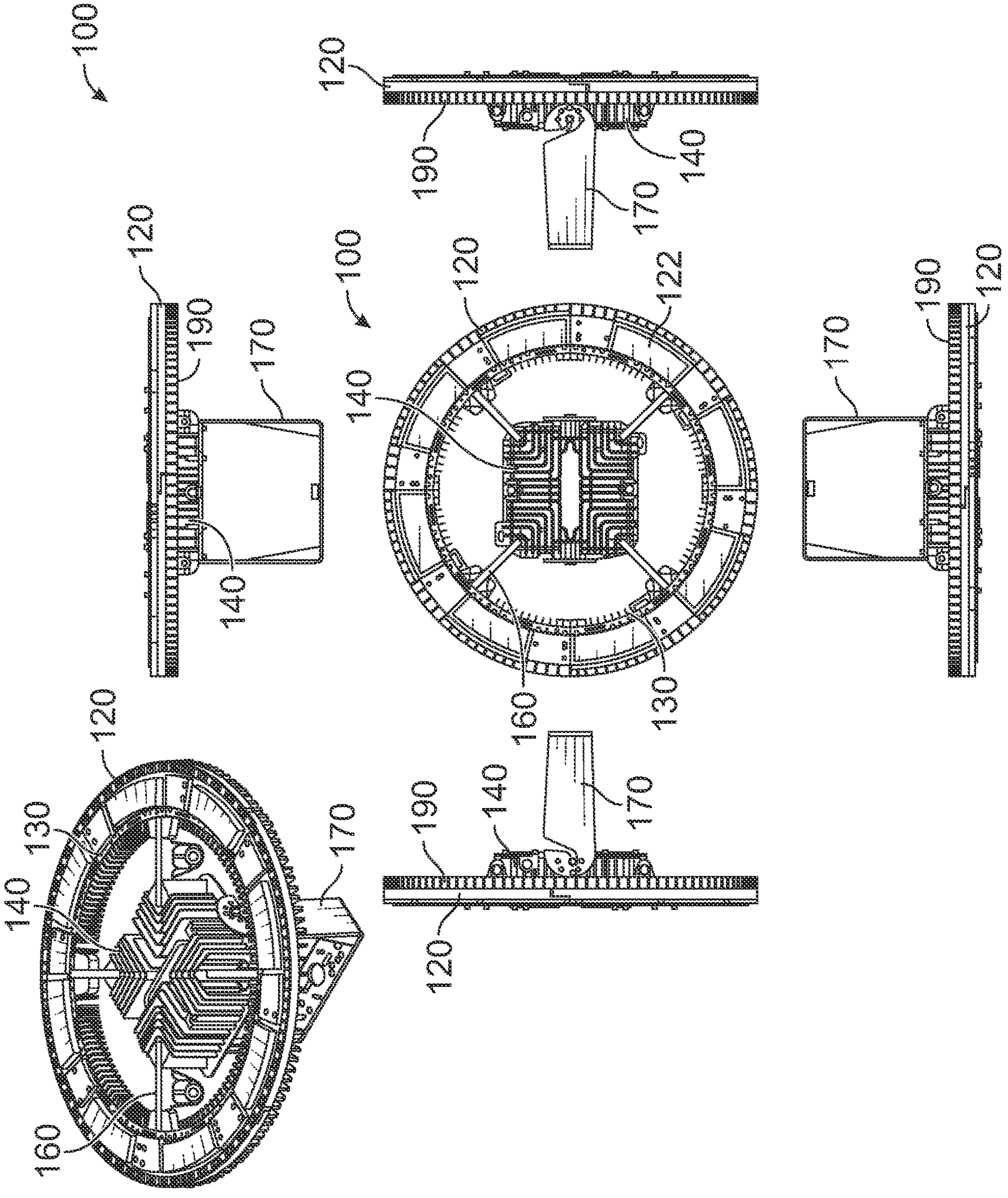
FIG. 3 illustrates a perspective bottom view, front view, rear view, right side view, left side view, and bottom side view of LED luminaire 100.

FIG. 3 illustrates a perspective bottom view, front view, rear view, right side view, left side view, and bottom view of LED luminaire 100. In the configuration shown in FIG. 3, the lumen output is 50,000 lumens. In FIG. 3, outer LED support member 120 is provided with LED arrays on a lower side thereof, and heat dissipating fins on an opposite side thereof extending towards LED driver housing 140. LED driver housing 140 is positioned within outer LED support member 120. Outer LED support member 120 is secured to LED driver housing 140 with mounting arms 160. Mounting bracket 170 is secured to the LED driver housing.

Figure 4:
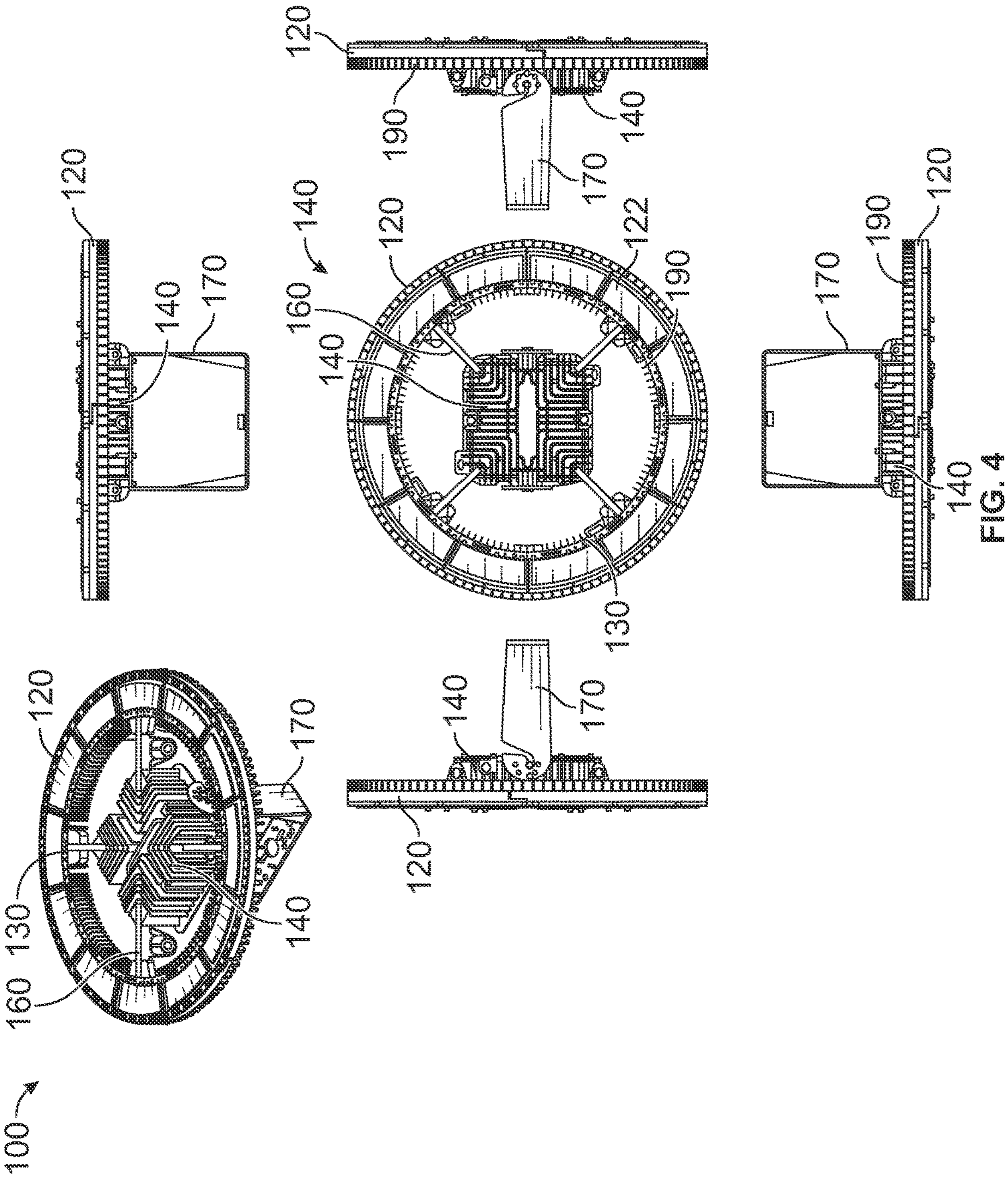
FIG. 4 illustrates a perspective bottom view, front view, rear view, right side view, left side view, and bottom side view of LED luminaire 100.

FIG. 4 illustrates a perspective bottom view, front view, rear view, right side view, left side view, and bottom view of LED luminaire 100. In the configuration shown in FIG. 4, the lumen output is 60,000 to 75,000 lumens. In FIG. 4, outer LED support member 120 is provided with LED arrays 122 on a lower side thereof, and heat dissipating fins on an opposite side thereof extending towards LED driver housing 140. LED driver housing 140 is positioned within outer LED support member 120. Outer LED support member 120 is secured to LED driver housing 140 with mounting arms 160. Mounting bracket 170 is secured to the LED driver housing 140. In the embodiment of FIG. 4, more LED arrays 122 are positioned on LED support member 120 to provide for more lumen output than shown in FIG. 3.

Figure 5:
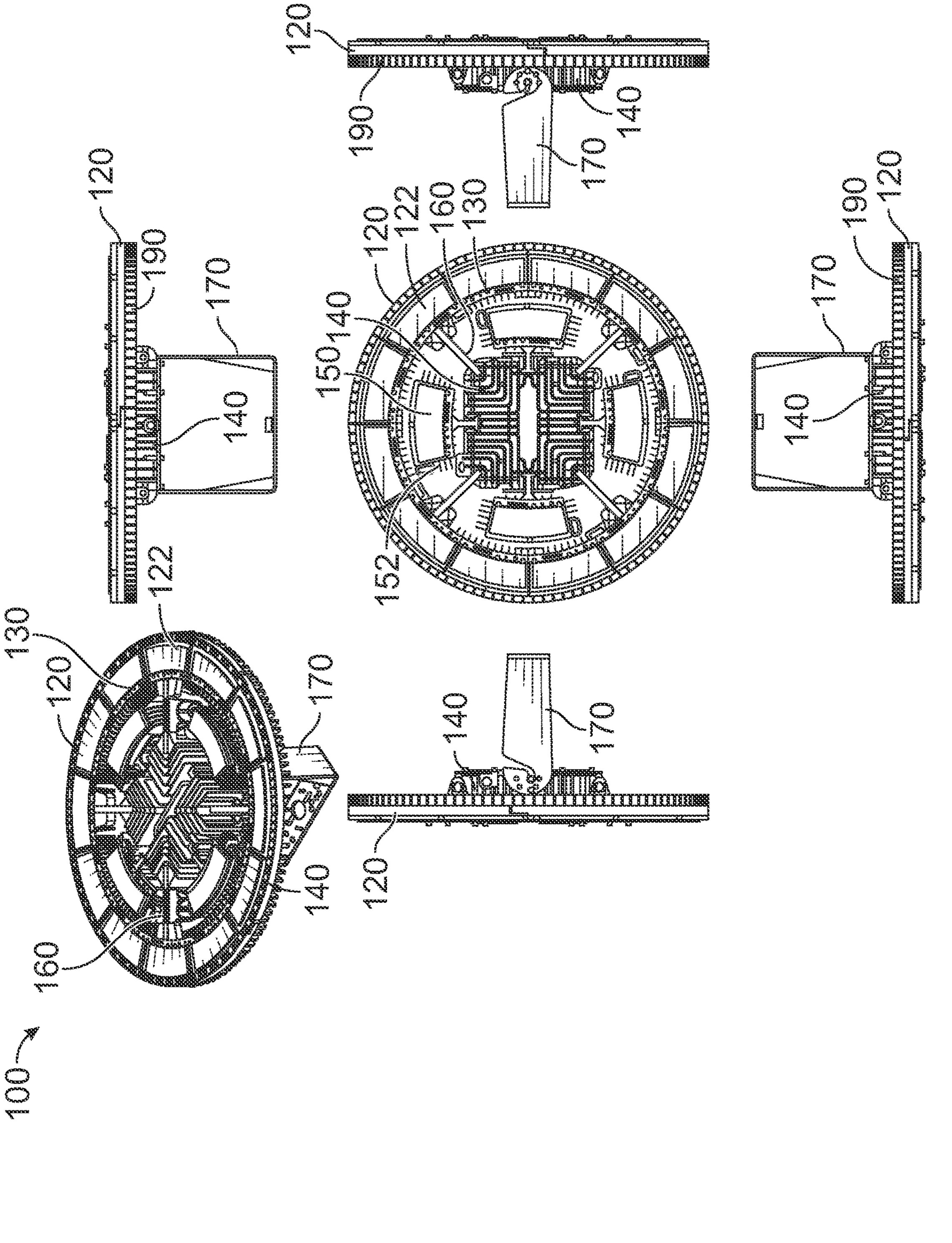
FIG. 5 illustrates a perspective bottom view, front view, rear view, right side view, left side view, and bottom side view of LED luminaire 100.

FIG. 5 illustrates a perspective bottom view, front view, rear view, right side view, left side view, and bottom view of LED luminaire 100 shown in FIGS. 1A and 1B. In the configuration shown in FIG. 5, the lumen output is 90,000 lumens. In FIG. 5, outer LED support member 120 is provided with LEDs 122 on a lower side thereof, and heat dissipating fins on an opposite side thereof extending toward LED driver housing 140. LED driver housing 140 is positioned within outer LED support member 120. Outer LED support member 120 is secured to LED driver housing 140 with mounting arms 160. Mounting bracket 170 is secured to the LED driver housing 140. There are advantageously open spaces between the inner mounting portion 130 of outer LED support member 120 and the LED driver housing 140 to provide for thermal separation between the LEDs 122 and the LED driver housing 140 and to improve heat dissipation. In this embodiment, a plurality of LED mounting extensions 150 are shown extending outwardly from the LED driver housing 140 and positioned inwardly from outer LED support member 120. One or more LED arrays are positioned on a lower surface of LED mounting extensions 150 and a plurality of heat dissipating fins are positioned on a top surface of LED mounting extensions 150. The LED mounting extensions 150 provide for increased lumen output for LED luminaire 100, and in this embodiment the LED luminaire 100 has an output of 90,000 lumens.

Figure 6B:
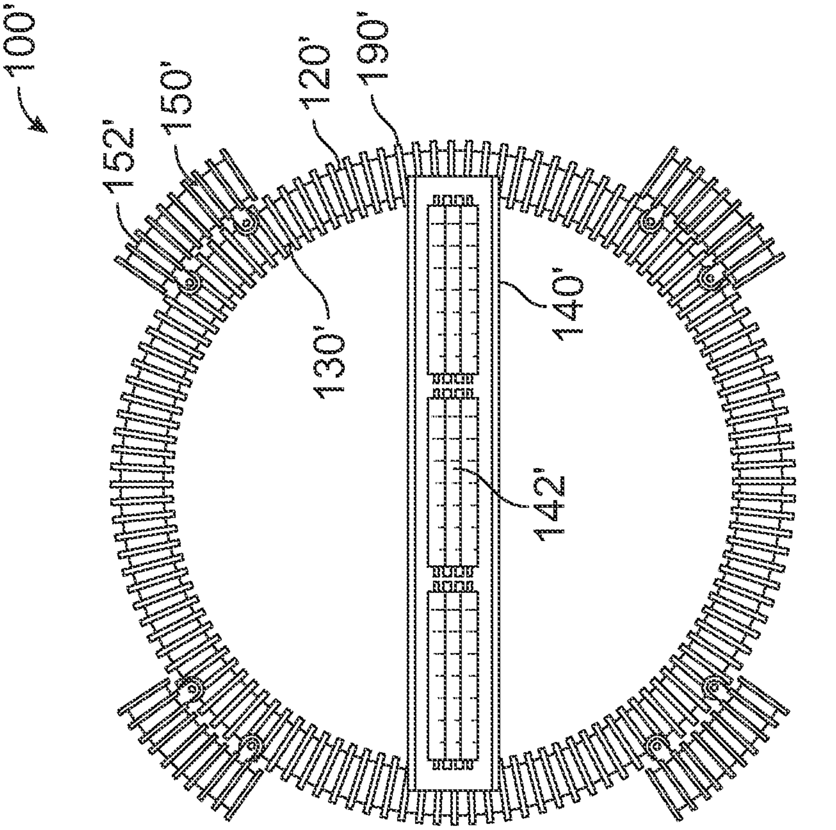
FIG. 6B illustrates a top view of LED luminaire 100'.
Figure 6A:
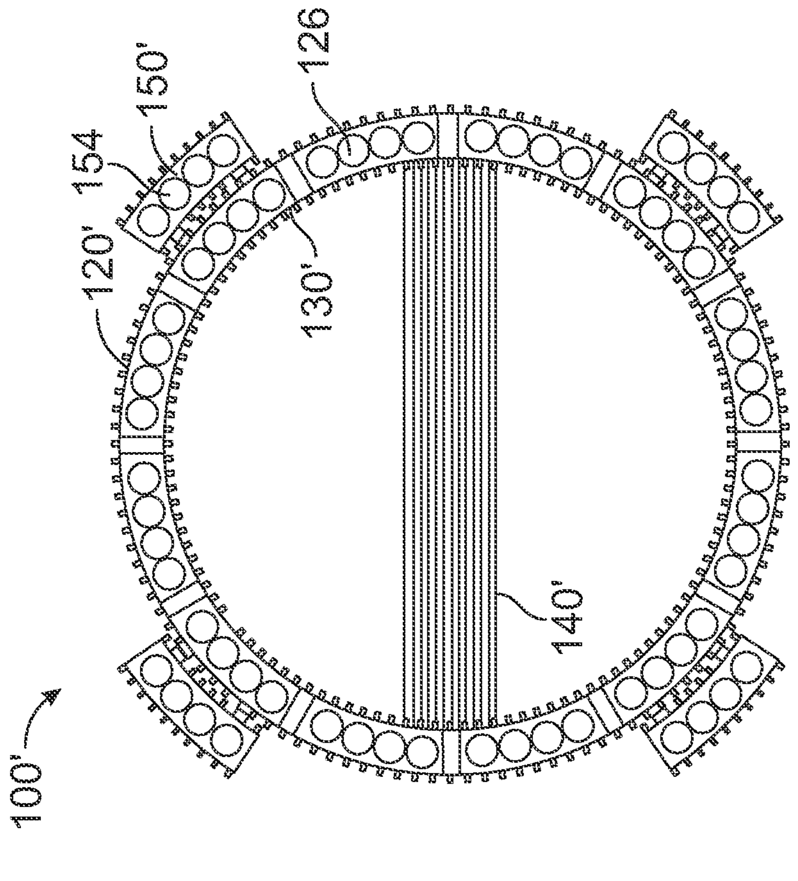
FIG. 6A illustrates a bottom view of LED luminaire 100'.

FIG. 6A illustrates a bottom view of LED luminaire 100' showing LED arrays 126 positioned on a bottom surface of outer LED support member 120'. An LED driver housing

140' extends across a diameter of opposite sides of outer LED support member 120'. LED mounting extensions 150' are secured to an outer surface of outer LED support member 120' and have a plurality of LEDs 154 mounted thereon.

FIG. 6B illustrates a top view of LED luminaire 100'. A plurality of heat dissipating fins 190' extend inwardly on an upper surface of LED support member 120'. A lower surface 142' of LED driver housing 140' is shown extending across a diameter of opposite sides of outer LED support member 120'. LED mounting extensions 150' are secured to an outer surface of outer LED support member 120' and have a plurality of heat dissipating fins positioned on an upper surface thereof.

Figure 7B:
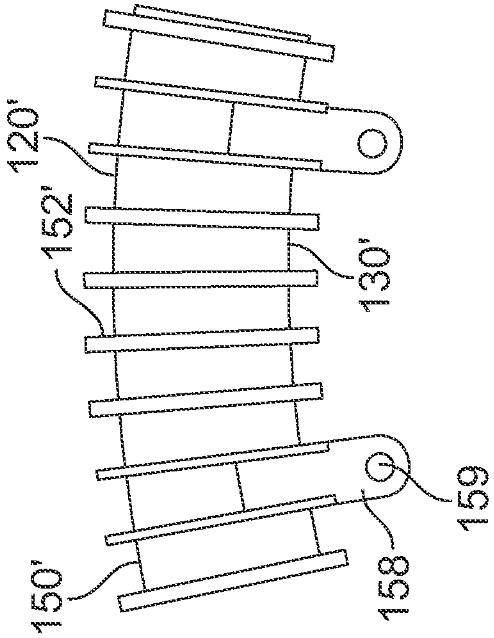
FIG. 7B illustrate a top view of LED mounting extension of LED luminaire 100 or 100'.
Figure 7A:
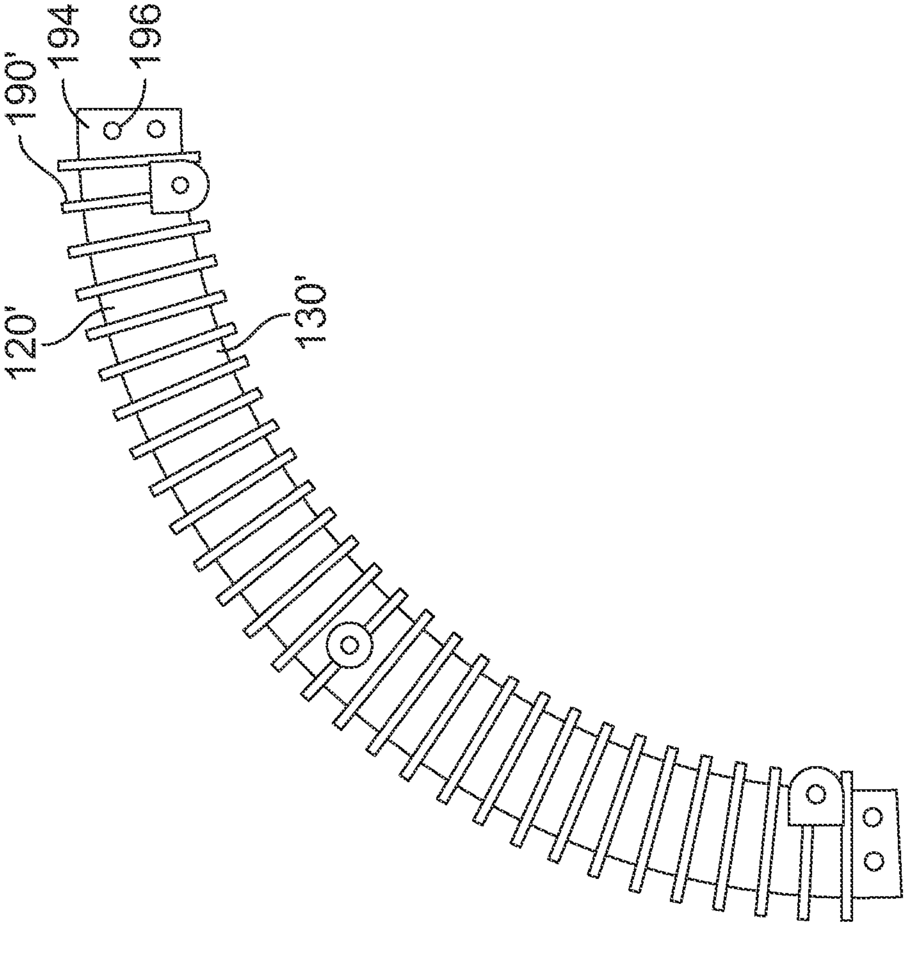
FIG. 7A illustrates an arced segment of LED luminaire 100'.

FIG. 7A illustrates an arced segment of LED luminaire 100'. Four arced segments are used to form outer LED support member 120'. Tabs 194 having apertures 196 are used to secure the arced segments to each other. A plurality of heat dissipating fines 190' are shown on a top surface of outer LED support member 120'.

FIG. 7B illustrate a top view of LED mounting extension 150' of LED luminaire 100 or 100' having a plurality of heat dissipating fins 152' thereon. Mounting extensions 158 having apertures 159 that are used to secure the LED mounting extension 150' to an outer surface of outer LED support member 120' of LED luminaire 100' to provide additional lumen output capabilities.

Figure 8:
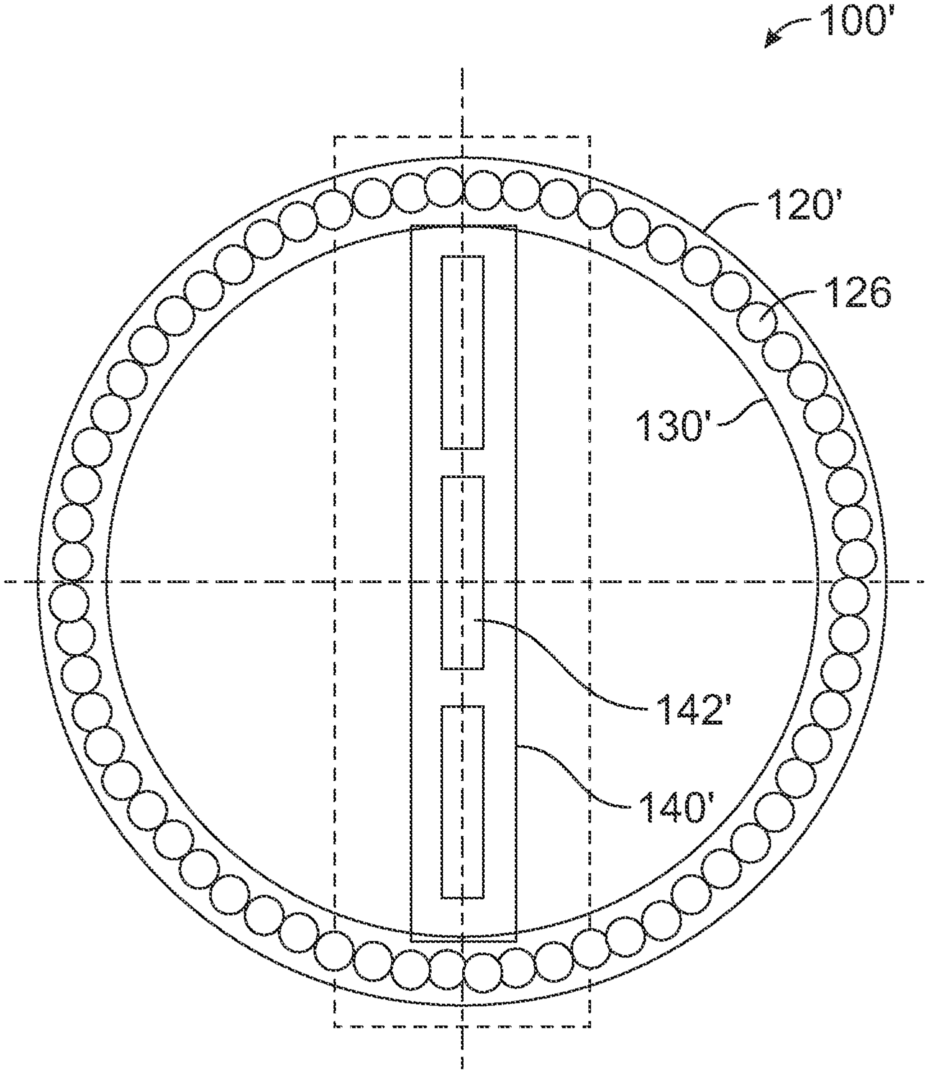
FIG. 8 illustrates a bottom view of LED luminaire 100'.

FIG. 8 illustrates a bottom view of LED luminaire 100' having LEDs 126 positioned on a lower surface of outer LED support member 120'. LED driver housing 140' having LED drivers 142' extends across a diameter between opposite sides of inner surfaces 130' of outer LED support member 120'.

Figure 9:
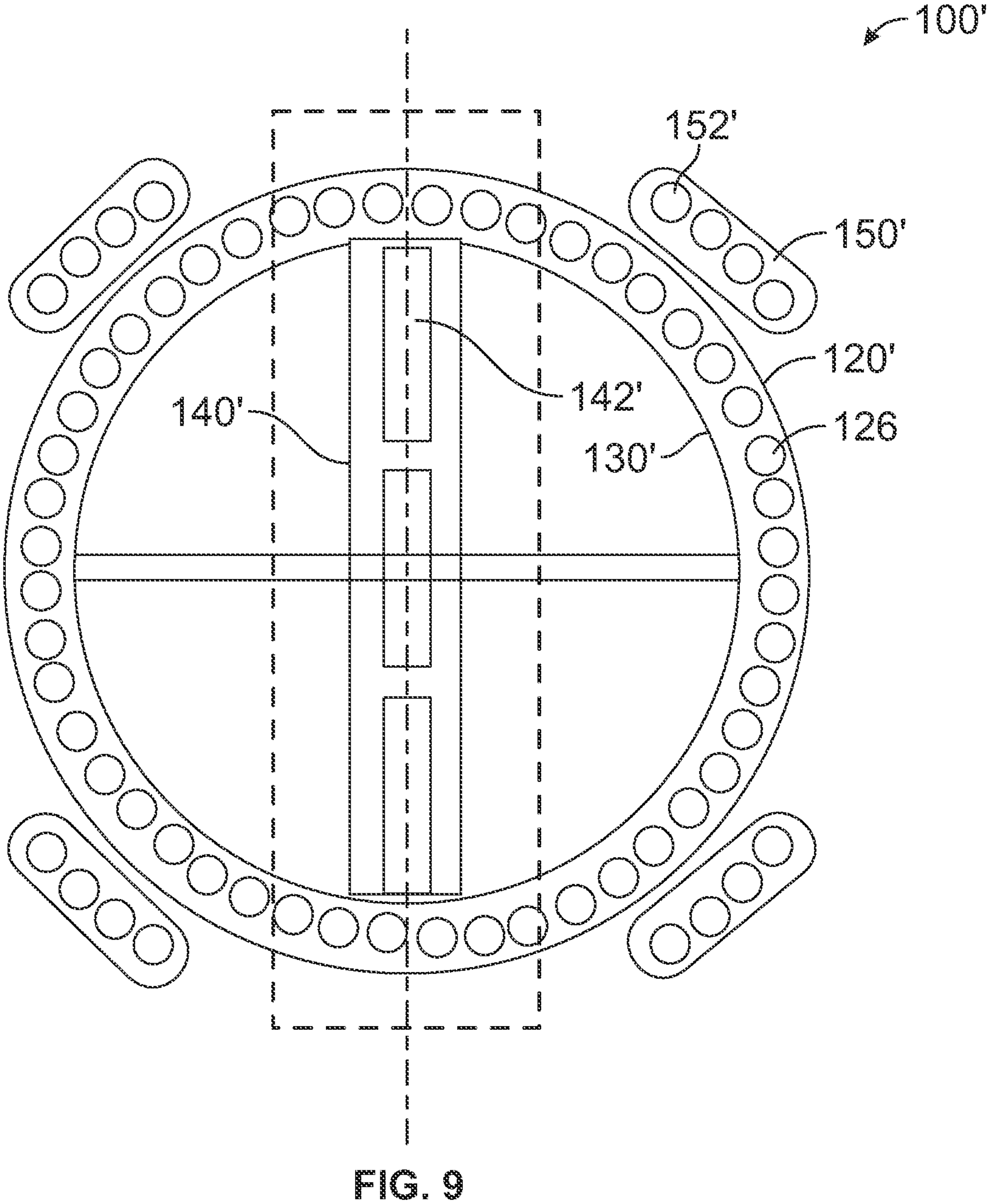
FIG. 9 illustrates another bottom view of LED luminaire 100' with LED mounting extensions 150'.

FIG. 9 illustrates another bottom view of LED luminaire 100' having LEDs 126 positioned on a lower surface of outer LED support member 120'. LED driver housing 140' having LED drivers 142' extends across a diameter between opposite sides of inner surfaces 130' of outer LED support member 120'. LED mounting extensions 150' having LEDs 154 positioned on a lower surface thereof are secured to, and extend from, an outer surface of outer LED support member 120' to provide additional lumen capacity for LED luminaire 100'.

It will be appreciated that in the above Figures inner surfaces 130' of LED support member 120' are shown as circular. However, inner surfaces 130' of LED support member 120' could have various geometries including square, hexagonal, or any other desired configuration.

It will also be appreciated that the present luminaires are modular, meaning that the same LED driver housing and LED array configurations can be used for LED luminaires having varying lumen outputs. For example, lumen outputs of 50,000 lumens, 60,000 lumens, and 75,000 lumens may be achieved. Further, by adding internal (see FIGS. 1A and 5) or external LED mounting extensions (see FIGS. 6A and 6B), lumen outputs of 90,000 lumens may be achieved.

Figure 10:
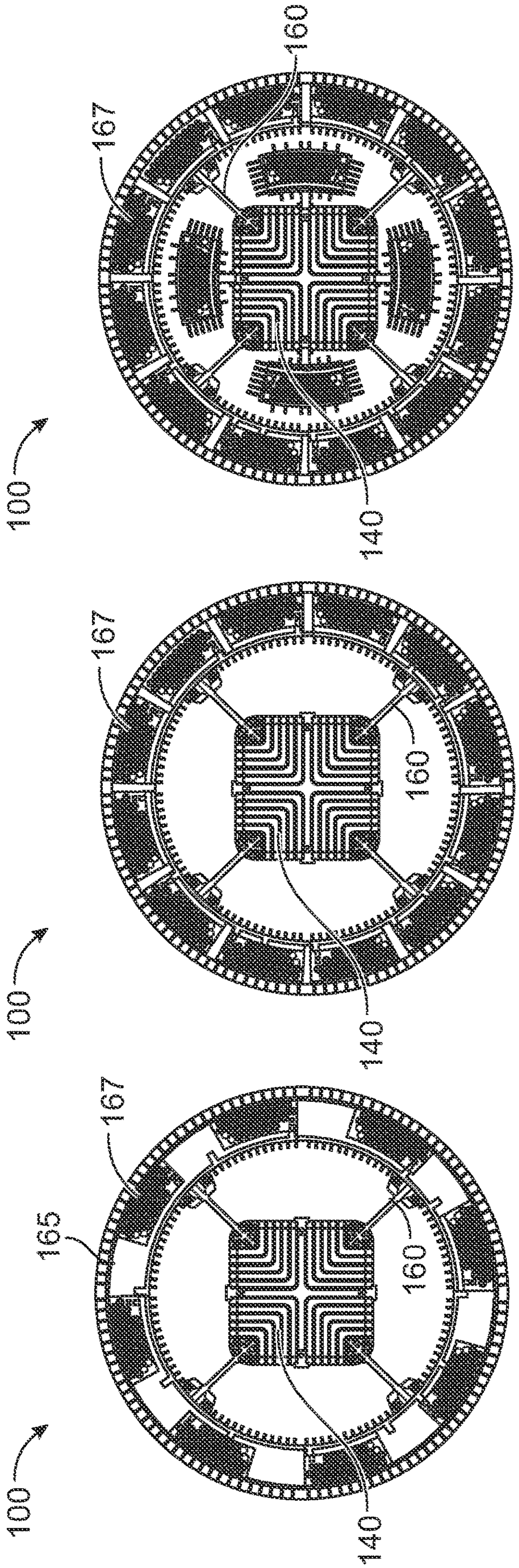
FIG. 10 illustrates a bottom view of LED luminaire 100, showing from left to right a 50,000 lumen version, a 60,000 to 75,000 lumen version, and a 90,000 lumen version.

FIG. 10 illustrates a bottom view of LED luminaire 100, showing from left to right a 50,000 lumen version, a 65,000 to 75,000 lumen version, and a 90,000 lumen version. In the 50,000 lumen version shown on the left, LED luminaire 100 includes LED arrays 167 with a dead spot 165 between adjacent LED arrays 167. A connecting member 160 extends from the outer LED support member 120 to LED driver housing 140. In the 60,000 lumen version and 75,000 lumen version shown in the center, LED luminaire 100 includes LED arrays 167 without a dead spot in between the LED arrays 167. A connecting member 160 extends from the outer LED support member 120 to LED driver housing 140. In the 90,000 lumen version shown on the right side of FIG. 10, LED luminaire 100 includes LED arrays 167 without a dead spot in between the LED arrays 167. In addition, LED mounting extensions 150 are shown extending outwardly from LED driver housing 140 to provide for additional lumen output capabilities. LED mounting extensions could also extend inwardly or outwardly from outer LED support member 120. Connecting members 160 extends from the outer LED support member 120 to LED driver housing 140.

Figure 11:
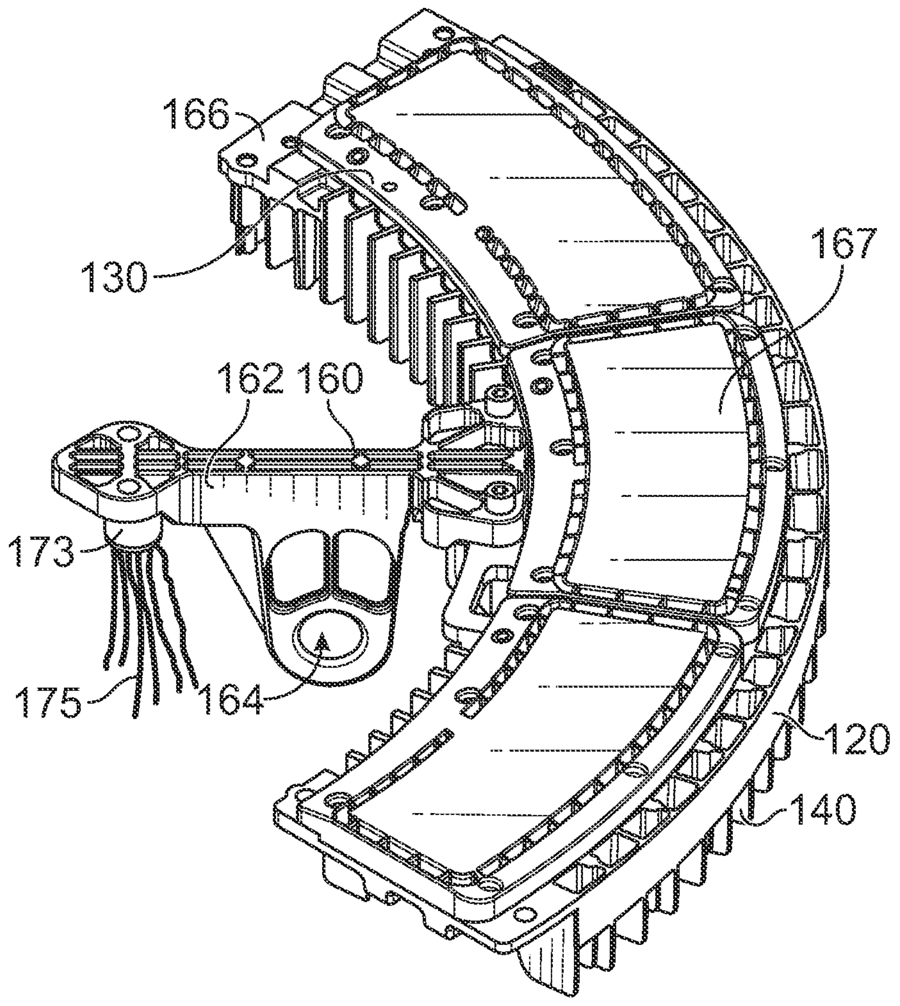
FIG. 11 illustrates a perspective bottom of a quarter view of outer LED support member 120 of LED luminaire 100.

FIG. 11 illustrates a perspective bottom view of a quarter of LED luminaire 100. Mounting flanges 166 are provided for attachment to an adjacent quarter of LED luminaire 100. LED arrays 167 are provided on a lower surface of outer LED support member 120. Mounting extension 160 is shown with an extending flange 162 having an aperture 164 for attachment to a mounting chain 183 shown in FIG. 14. Mounting extension 160 further includes a gasket 173 to seal wires 175 that extend to the LED driver housing 140.

Figure 12A:
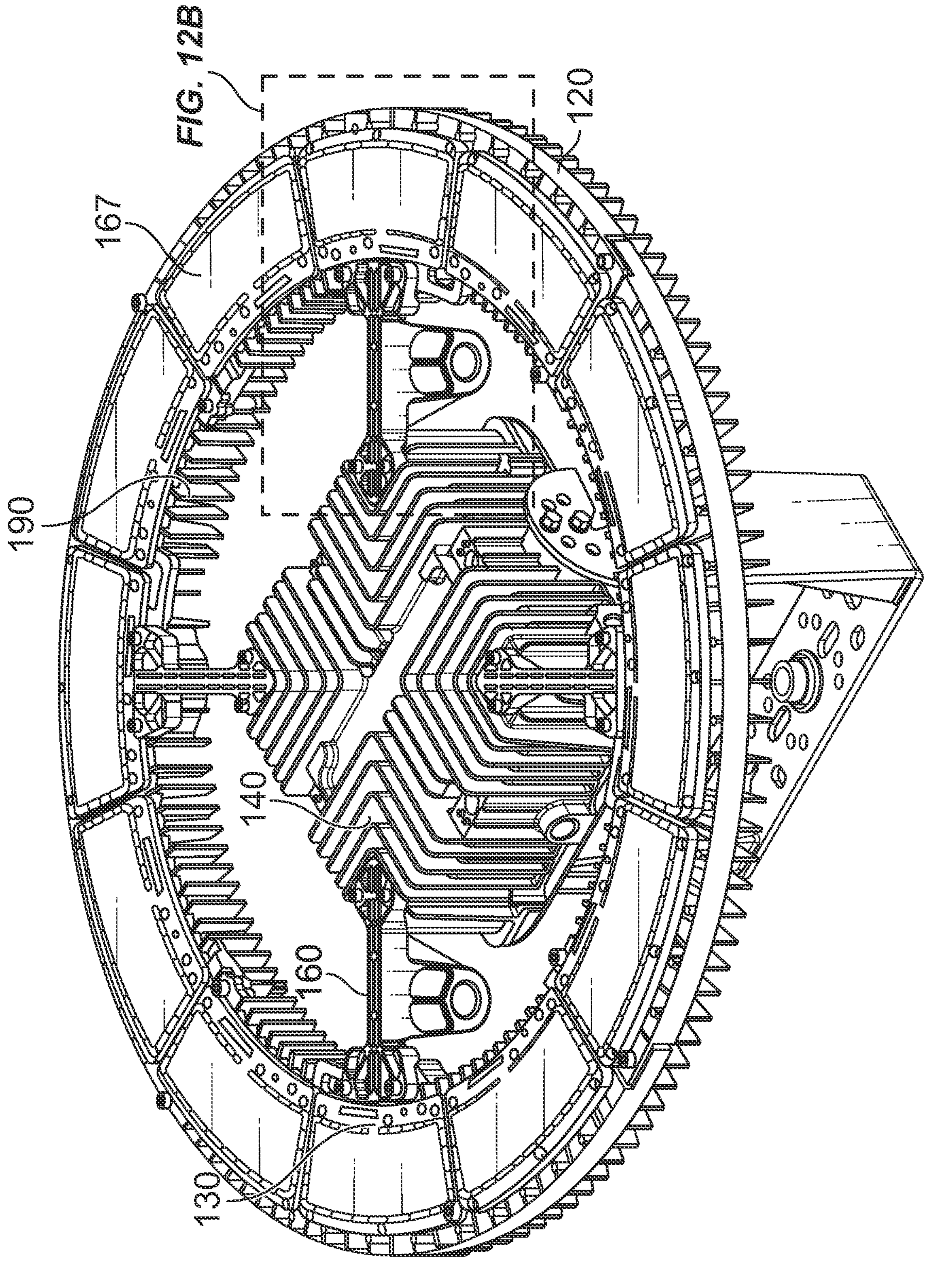
FIG. 12A illustrates a perspective bottom view of LED luminaire 100.

FIG. 12A illustrates a perspective bottom view of LED luminaire 100. LED arrays 167 are provided on a lower surface of outer LED support member 120. Heat dissipating fins 190 are positioned on an upper surface of LED support member 120. Mounting extensions 160 extend from inner surface 130 of outer LED support member 120 to LED driver housing 140.

Figure 12B:
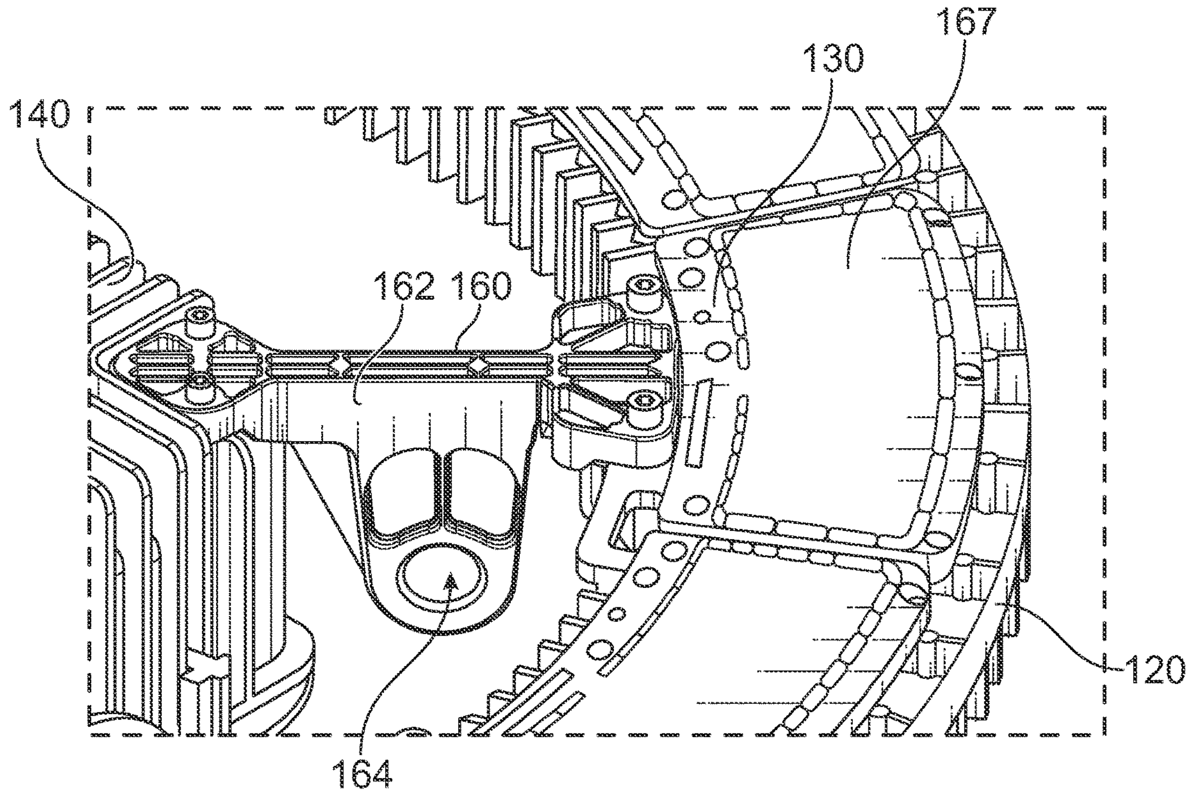
FIG. 12B illustrates a partial perspective bottom view of LED luminaire 100 shown in FIG. 12A.

FIG. 12B illustrates a partial perspective bottom view of LED luminaire 100 shown in FIG. 12A. LED arrays 167 are provided on a lower surface of outer LED support member 120. Mounting extension 160 extends from inner surface 130 of outer LED support member 120 to LED driver housing 140. Mounting extension 160 includes an extending flange 162 having an aperture 164 for attachment to a mounting chain 183 shown in FIG. 14.

Figure 13:
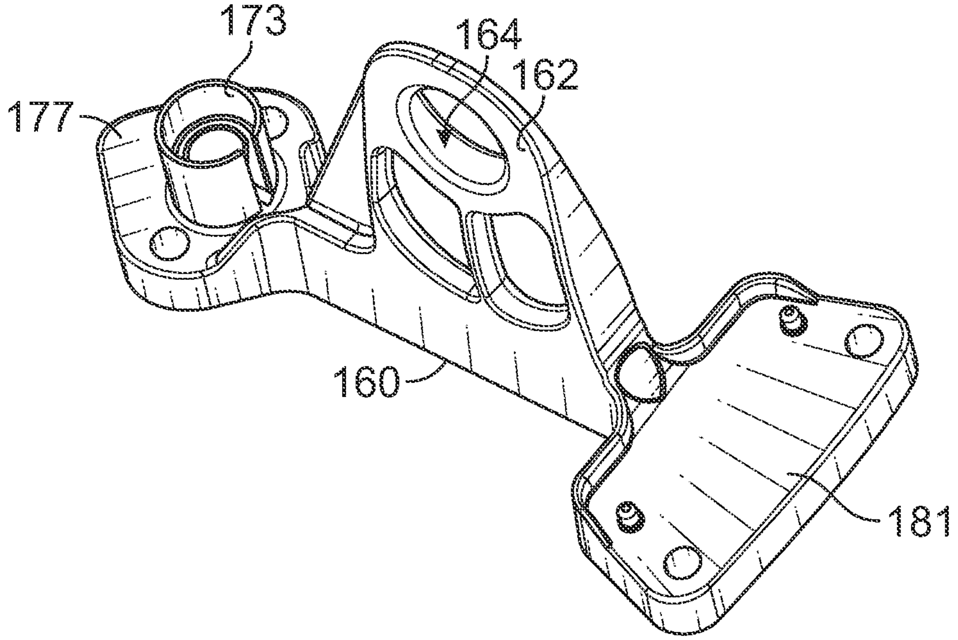
FIG. 13 shows a perspective bottom view of connecting member 160.

FIG. 13 shows a perspective bottom view of connecting member 160. Mounting extension 160 includes an extending flange 162 having an aperture 164 for attachment to a mounting chain 183 shown in FIG. 14. Mounting extension 160 further includes a gasket 173 extending from inner flange 177 to seal wires that extend to the LED driver housing 140. An outer flange 181 is also provided for attachment to outer LED support member 120.

Figure 14:
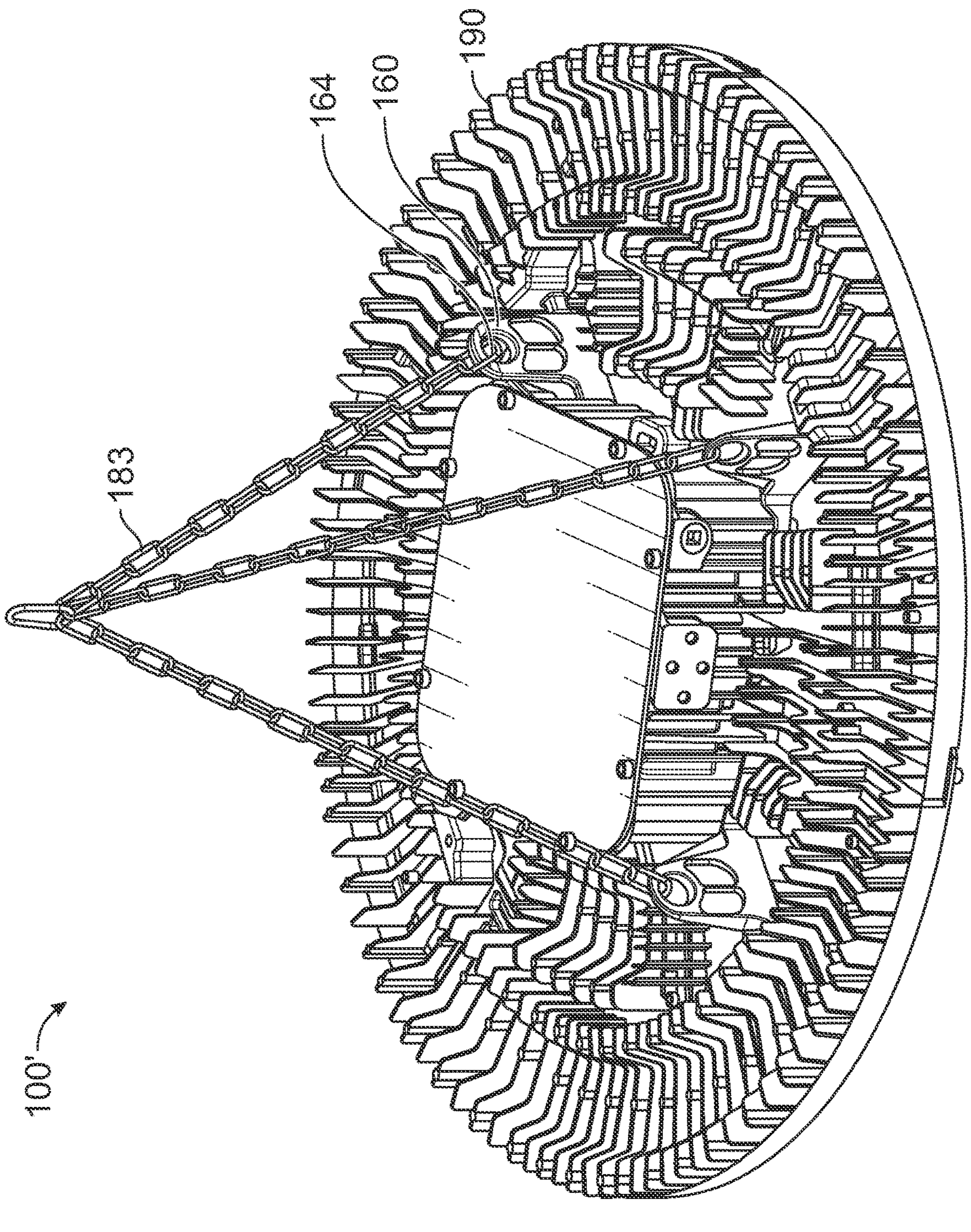
FIG. 14 shows a perspective top view of LED luminaire 100'.

FIG. 14 shows a perspective top view of LED luminaire 100'. In this embodiment, LED luminaire 100' is mounted to a ceiling using mounting chain 183 that is secured to aperture 164 on mounting extension 160.

Figure 15:
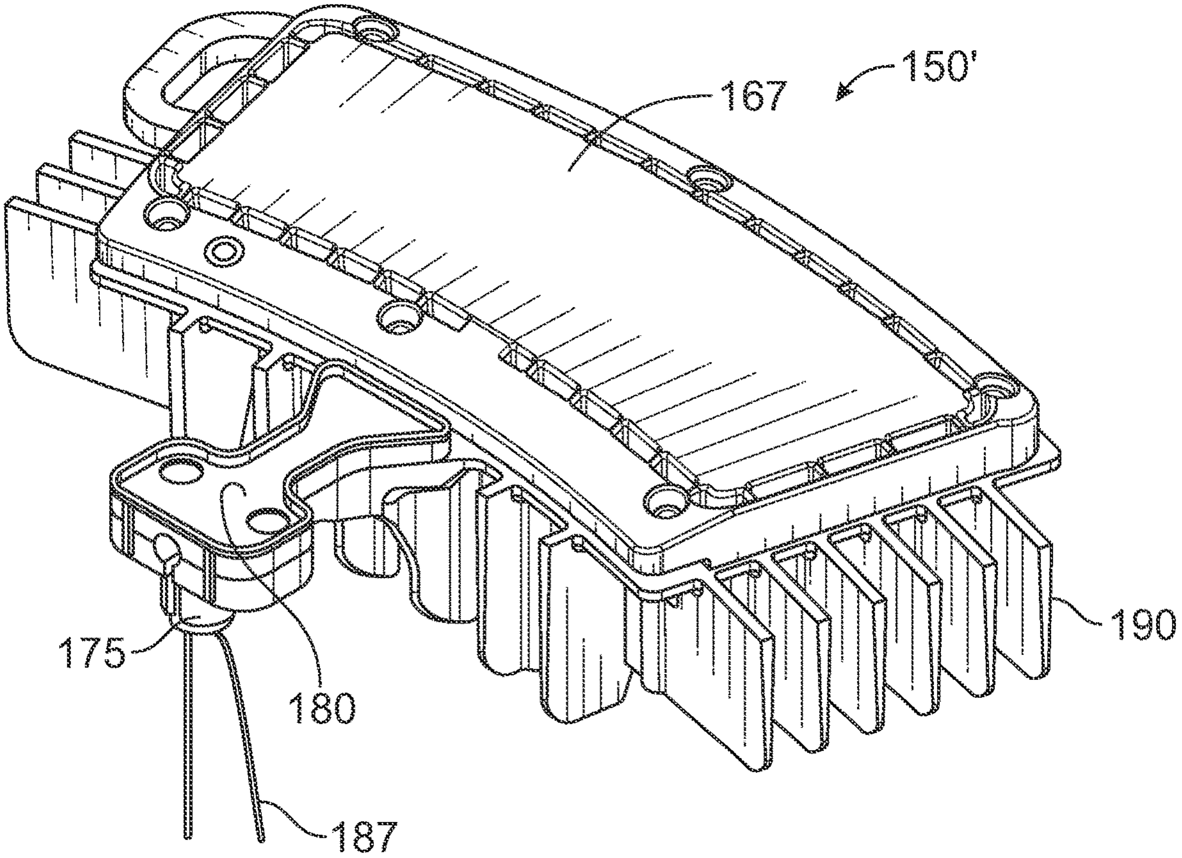
FIG. 15 shows a perspective bottom view of an embodiment that can be used for LED mounting extension 150' shown in FIG. 7B or 9.

FIG. 15 shows a perspective bottom view of an embodiment that can be used for LED mounting extension 150' shown in FIG. 7B or 9. Flange 180 extends inwardly from LED mounting extension 150' for attachment to an outer surface of outer LED support member 120. A gasket 175 is provided on flange 180 to seal wires 187 that ultimately extend directly or indirectly to the LED driver housing 140. LED array 167 is provided on a lower surface of LED mounting extension 150' and heat dissipating fins 190 are positioned on an upper surface of LED mounting extension 150'.

The foregoing disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the foregoing description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

We claim:

1. An LED luminaire, comprising:

an outer LED support member having a plurality of LED arrays positioned on a lower side thereof;

an LED driver housing centrally located within an interior of the outer LED support member; wherein the outer LED support member is secured to the LED driver housing with a plurality of attachment arms that extend from inner surface of the outer LED support member to the LED driver housing, such that are open spaces between the plurality of attachment arms and between the inner surface of outer LED support member and the LED driver housing;

a plurality of heat dissipating fins positioned on an upper surface of the outer LED support member extending towards the LED driver housing;

a plurality of LED mounting extensions mounted to, and extending outwardly from, an outer surface of the LED driver housing;

one or more LED arrays positioned on a lower surface of each of the LED mounting extensions; and a plurality of heat dissipating fins positioned on an upper surface of each of the LED mounting extensions, wherein the LED arrays positioned on the LED mounting extensions provide for additional lumen output for the LED luminaire.

2. The LED luminaire as claimed in claim 1, wherein the outer LED support member is an annular circular ring.

3. The LED luminaire as claimed in claim 1, wherein the lower side of the outer LED support member and a lower surface of the LED driver housing are coplanar.

4. The LED luminaire as claimed in claim 1, wherein the LED driver housing is shaped to include a plurality of corners, and the attachment arms are secured to the corners of the LED driver housing.

5. The LED luminaire of claim 1, wherein the outer LED support member is comprised of a plurality of arced sections that are affixed to each other.

6. The LED luminaire of claim 1, wherein a distance between an outer surface of the outer LED support and an inner surface of the outer LED support member is between 50 and 70 millimeters.

7. The LED luminaire as claimed in claim 1, further comprising:

a mounting bracket is provided having a flat upper mounting surface having a plurality of mounting holes therein and a pair of mounting arms downwardly extending from the flat upper mounting surface, wherein lower ends of the pair of mounting arms are adapted for attachment to the LED driver housing.

8. The LED luminaire as claimed in claim 7, further comprising:

a grooved slot formed on the lower ends of each of the pair of mounting arms;

mounting extensions positioned on sides of the LED driver housing, wherein the grooved slots are adapted to engage the mounting extensions.

9. The LED luminaire as claimed in claim 1, wherein the LED luminaire is modular such that various LED arrays may be positioned on the LED luminaire to provide varying levels of lumen output.

10. The LED luminaire as claimed in claim 9, wherein the LED luminaire is configured to provide LED array configurations having lumen output levels of 50 k, 60 k, 75 k, or 90 k lumens.

11. The LED luminaire of claim 1, further comprising:

a top lid attached to a top surface of the LED driver housing.

12. The LED luminaire of claim 11, wherein the top cover is attached to the top surface of the LED driver housing with captive screws.

13. An LED luminaire, comprising:

an outer LED support member having a plurality of LED arrays positioned on a lower side thereof;

a plurality of heat dissipating fins positioned on an upper side of the outer LED support member;

an LED driver housing positioned within the outer LED support member having a first end attached to a first inner surface of the outer LED support member, the LED driver housing having a second end attached to an oppositely disposed second inner surface of the outer LED support member;

wherein there are open spaces between sides of the LED driver housing and the outer LED support member, wherein the outer LED support member has an annular circular ring shape; and further comprising:

a plurality of LED mounting extensions mounted to, and extending outwardly from an outer surface of the outer LED support member, or extending inwardly from an inner surface of the LED support member;

one or more LED arrays positioned on a lower surface each of the LED mounting extensions; and a plurality of heat dissipating fins positioned on an upper surface of each of the LED mounting extensions, wherein the LED arrays positioned on the LED mounting extensions provide for additional lumen output for the LED luminaire.

14. The LED luminaire as claimed in claim 13, further comprising:

a mounting bracket is provided having a flat upper mounting surface having a plurality of mounting holes therein and a pair of mounting arms downwardly extending from the flat upper mounting surface, wherein lower ends of the pair of mounting arms are adapted for attachment to the LED driver housing.

15. The LED luminaire as claimed in claim 14, further comprising:

mounting extensions positioned on opposite sides of the LED driver housing; and a grooved slot formed at the lower ends of each of the pair of mounting arms, the grooved slots adapted to engage the mounting extensions.

16. An LED luminaire, comprising:

an outer LED support member having a plurality of LED arrays positioned on a lower side thereof;

an LED driver housing centrally located within an interior of the outer LED support member;

wherein the outer LED support member is secured to the LED driver housing with a plurality of attachment arms that extend from inner surface of the outer LED support member to the LED driver housing, such that are open spaces between the plurality of attachment arms and between the inner surface of outer LED support member and the LED driver housing; and a plurality of heat dissipating fins positioned on an upper surface of the outer LED support member extending towards the LED driver housing;

a plurality of LED mounting extensions are mounted to, and inwardly from, an inner surface of the outer LED support member;

one or more LED arrays positioned on a lower surface of each of the LED mounting extensions; and a plurality of heat dissipating fins that are positioned on an upper surface of each of the LED mounting extensions, wherein the LED arrays positioned on the LED mounting extensions provide for additional lumen output for the LED luminaire.

* * * * *